Jan. 12, 1937.  F. KREFFT  2,067,768
BALL AND SOCKET JOINT FOR PIPES
Filed Jan. 19, 1934
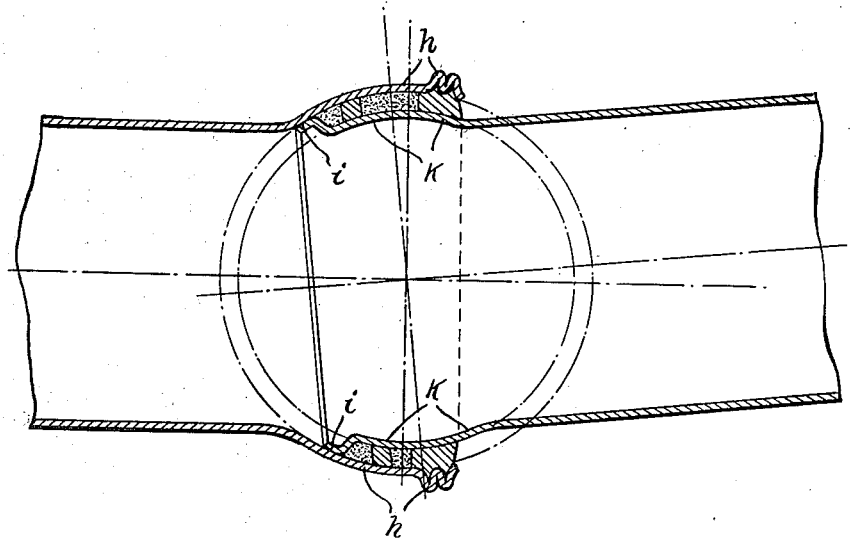
INVENTOR
FRIEDRICH KREFFT
by his attorneys
Howson and Howson Patented Jan. 12, 1937

2,067,768

UNITED STATES PATENT OFFICE 2,067,768

BALL AND SOCKET JOINT FOR PIPES

Friedrich Krefft, Dusseldorf-Oberkassel, Germany

Application January 19, 1934, Serial No. 707,352
In Germany March 18, 1933

1 Claim. (Cl. 285—91)

This invention relates to improvements in ball and socket joints for pipes.

When pipe joints which are caulked with jointing material such, for example, as lead and tow or the like, are employed in piping, it has usually been necessary when making bends in the piping, even of slight extent, to insert separately made bend sections in the piping, since a bend within such a joint prejudices the security of the pipe inserted in the socket, and has generally resulted in an unequal thickness of the sealing joint, which reduces the tightness of the joint below the safety limit allowable.

In another construction the socket is made globular and the straight pipe inserted therein is turned up so that the outer edge of the end marginal portion corresponds in configuration to the globular surface of the socket. This construction, however, has the disadvantage that with the adjacent pipe sections disposed relatively to one another in an angular position the hollow space formed between the inserted pipe and the socket is of a different size at different points, similarly to the case of an ordinary lead caulked spigot and socket joint.

It has therefore already been proposed also to make the inserted pipe end of globular form. In order to provide the necessary hollow space for the lead caulking or the like, the socket has been considerably enlarged but the enlargement has presented the disadvantage of necessitating increased work and costs in the moulding operations when producing the socketed pipes. Furthermore, a safeguard has to be provided against the inserted pipe end automatically working loose. Thus, the costs of production are increased and the manufacture rendered more difficult.

The invention provides a ball and socket pipe joint which enables bends in pipes to be formed within certain limits to an extent corresponding to requirements, without the necessity of special bend sections, whilst avoiding the above mentioned disadvantages.

According to the invention there is provided a ball and socket pipe joint caulked with lead, hemp, rubber or similar material characterized by the end of the inserted pipe being provided with a peripheral edge or surface corresponding in external diameter to the inner diameter of the portion of the spherical socket surrounding it and with a stepped or retracted spherical portion of smaller diameter than and concentric with the inner surface of the socket and which extends between the said end edge or surface and the straight portion of the pipe.

In order that the invention may be fully understood reference is directed to the accompanying drawing in which:—

Figure 1 illustrates a longitudinal section through a ball and socket pipe joint constituting one example of the invention.

Joints constructed in accordance with the invention are provided with a space for the sealing material formed by a suitable inwardly stepped portion of the end of the inserted pipe constituting the ball of the joint, whereby the above-mentioned disadvantages are avoided.

The socket on the outer pipe is of a spherical form and is strengthened at its edge in a known manner by one or more peripheral beads, reinforcing rings or the like. The end of the inner pipe forming the ball of the joint is provided at the end with a small spherical surface $i$ arranged, when the said end is inserted into the socket to bear thereagainst. Extending between the surface $i$ and the straight portion of the inner pipe is a spherical portion $k$ which is stepped or retracted inwardly of the pipe to a predetermined extent, the surface of the portion $k$ being parallel to the sphere of generation of the surface $i$, as shown by the circles in dot and dash lines. A free space is thus provided between the portion $k$ and the socket $h$ which is of a spherical annular form into which the jointing material can be inserted. This material can, as with known joints, consist of lead, tow, rubber or other suitable materials which can also be used in combination with each other.

Owing to the space necessary for accommodating the jointing material being formed by the stepping or retraction of the portion $k$ of the inserted pipe instead of by enlarging the socket $h$, the inner pipe diameter at the joint is only increased from the normal to a small extent. Furthermore, the end $i$ of the inner pipe is forced against the socket by the jointing material engaging behind the portion $k$ which is less than the full spherical diameter where it joins the straight portion of the pipe, the edge of the socket extending to this junction.

Thus the inserted pipe cannot draw out of the socket.

When inserting the jointing material and caulking the same the caulking forces produced in the jointing material act against the shoulder adjacent to the end $i$ of the pipe and thereby press still more firmly the end of the inserted pipe against the inner wall of the socket $h$, whereby an absolutely firm and securely sealed joint is attained.

In consequence of the concentrically spherical form of the socket $h$ and the surface $i$ and $k$ of the inserted pipe, the two pipes can be connected together at any inclination to each other within a predetermined range with the assurance that the perfect support of the end $i$ of the inner pipe in the socket $h$ and a uniform thickness of the jointing material will be maintained around the whole circumference of the joint.

The surface $i$ can also be made narrower than shown in the drawing and, in certain circumstances, can be dispensed with altogether, in which case the edge of the conical shoulder forming the transitional portion between the portions $k$ and $i$ in the joint illustrated rests against the socket. The elements of the ball and socket pipe joint are formed from steel. These elements are shown in the drawing as being of substantially the same uniform thickness as the remainder of the respective pipe sections.

I claim:—

A rigid connection for steel pipe sections of permanent angular disposition in a pipe line, comprising in combination, a rolled steel pipe having a substantially spherical socket of larger diameter than the pipe, an inserted pipe having a substantially spherical end of smaller diameter than the spherical socket and an outwardly flared flange at the end of the inserted pipe which lies within the socket, said flange having a diameter slightly greater than the diameter of the pipe whereby when said pipe end is inserted in said socket said flange engages the interior wall of the socket for limiting the insertion of said end into the socket to less than the full depth of the socket, thereby providing a chamber with an annular entrance of uniform depth between said pipe end and socket for the reception of caulking material.

FRIEDRICH KREFFT.